(12) United States Patent
Beagen et al.

(10) Patent No.: US 11,828,397 B2
(45) Date of Patent: Nov. 28, 2023

(54) BRACKET ASSEMBLY FOR FIRE SPRINKLER SUPPORT ASSEMBLY

(71) Applicant: ASC Engineered Solutions, LLC, Exeter, NH (US)

(72) Inventors: Joseph Beagen, North Attleboro, MA (US); Odair Dafonseca, Pawtucket, RI (US); William Tyler Howe, Worcester, MA (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 44 days.

(21) Appl. No.: 17/409,565

(22) Filed: Aug. 23, 2021

(65) Prior Publication Data

US 2021/0381625 A1  Dec. 9, 2021

Related U.S. Application Data (63) Continuation of application No. 16/733,799, filed on Jan. 3, 2020, now Pat. No. 11,125,359, which is a
(Continued)

(51) Int. Cl.
*F16L 3/24* (2006.01)
*F16M 13/02* (2006.01)
(Continued)

(52) U.S. Cl.
CPC ............... *F16L 3/24* (2013.01); *A62C 31/28* (2013.01); *A62C 35/68* (2013.01); *E04B 9/006* (2013.01);
(Continued)

(58) Field of Classification Search
CPC . A62C 35/68; A62C 31/28; F16L 3/24; F16L 3/245; F16M 13/027; F16M 13/022;
(Continued)

(56) References Cited

U.S. PATENT DOCUMENTS 3,207,057 A * 9/1965 Brown ................... E04B 9/242
454/301
3,815,309 A * 6/1974 Olsen .................. E04F 13/0812
52/235
(Continued)

FOREIGN PATENT DOCUMENTS

WO  2019164717  8/2019

OTHER PUBLICATIONS

Beagen, Joseph William; Examination Report for UK Patent application No. 2011328.8, filed Feb. 13, 2019, dated Dec. 14, 2021, 2 pgs.
(Continued)

*Primary Examiner* — Ingrid M Weinhold
(74) *Attorney, Agent, or Firm* — Taylor English Duma LLP (57) ABSTRACT

A bracket assembly includes an inner plate defining a first end and a second end opposite the first end; an outer plate defining a first end and a second end opposite the first end, the outer plate substantially parallel with the inner plate; a first member extending from the second end of the inner plate, the first member defining a first free end distal to the inner plate; and a second member extending from the second end of the outer plate, the second member defining a second free end distal to the outer plate; wherein at least one of the first free end and the second free end is angled away from the other of the first free end and the second free end, such that a distance between the first member and the second member increases towards the first and second free ends.

17 Claims, 6 Drawing Sheets

Related U.S. Application Data continuation of application No. 15/903,482, filed on Feb. 23, 2018, now Pat. No. 10,561,873.

(51) Int. Cl.
  *A62C 35/68* (2006.01)
  *E04B 9/00* (2006.01)
  *E04B 9/20* (2006.01)
  *A62C 31/28* (2006.01)
  *E04B 9/12* (2006.01)

(52) U.S. Cl.
  CPC ............... *E04B 9/127* (2013.01); *E04B 9/20* (2013.01); *F16M 13/022* (2013.01)

(58) Field of Classification Search
  CPC . E04B 9/006; E04B 9/127; E04B 9/20; B05B 15/60; F16B 2/10; F16B 2/065; F16B 2/241; F16B 2/20; F16B 2/205; F16B 2/22; F16B 2/24; F16B 2/245
  USPC .......................... 169/51; 248/200.1, 200, 300
  See application file for complete search history.

(56) References Cited

U.S. PATENT DOCUMENTS

| | | | | |
|---|---|---|---|---|
| 4,408,428 | A * | 10/1983 | Brooke | E04B 9/242 |
| | | | | 52/506.07 |
| 4,679,375 | A * | 7/1987 | Shirey | E04B 9/242 |
| | | | | 52/777 |
| 4,858,408 | A * | 8/1989 | Dunn | E04B 9/242 |
| | | | | 24/562 |
| 4,873,809 | A * | 10/1989 | Paul | E04B 9/242 |
| | | | | 52/506.07 |
| 4,967,530 | A * | 11/1990 | Clunn | E04B 9/242 |
| | | | | 52/204.591 |
| D315,673 | S * | 3/1991 | Paul | D8/382 |
| D400,718 | S * | 11/1998 | Bortolus | D6/328 |
| 5,970,586 | A * | 10/1999 | Demel | B60J 10/32 |
| | | | | 24/563 |
| D421,897 | S * | 3/2000 | Washecheck | D8/395 |
| 6,260,810 | B1 | 7/2001 | Choi | |
| 6,530,747 | B1 * | 3/2003 | Schneider | F16B 2/245 |
| | | | | 416/500 |
| 6,554,231 | B2 | 4/2003 | Choi | |
| 6,811,130 | B1 | 11/2004 | Oh | |
| 7,062,886 | B2 * | 6/2006 | Auriemma | E04B 9/242 |
| | | | | 52/489.1 |
| 7,234,674 | B2 | 6/2007 | Rippel et al. | |
| 7,240,884 | B2 | 7/2007 | Shim | |
| 7,427,051 | B2 | 9/2008 | Oh | |
| 7,621,493 | B2 | 11/2009 | Vermette et al. | |
| D606,852 | S * | 12/2009 | Boyd | D8/395 |
| 7,735,787 | B2 | 6/2010 | Kafenshtok et al. | |
| 7,735,794 | B1 | 6/2010 | Gretz | |
| 8,109,482 | B2 | 2/2012 | Oh | |
| 8,413,734 | B2 | 4/2013 | Silcox et al. | |
| 8,500,079 | B2 | 8/2013 | Oh | |
| 8,701,254 | B2 * | 4/2014 | Lin | B25B 5/06 |
| | | | | 24/336 |
| 8,820,686 | B2 | 9/2014 | Hickle et al. | |
| 8,833,718 | B2 | 9/2014 | Oh | |
| 8,833,719 | B2 | 9/2014 | Lim | |
| 9,004,421 | B2 | 4/2015 | Feenstra | |
| 9,004,422 | B2 | 4/2015 | Feenstra | |
| 9,068,689 | B2 | 6/2015 | Hickle et al. | |
| 9,174,077 | B2 | 11/2015 | Lim | |
| 9,526,934 | B2 | 12/2016 | Jung | |
| 9,534,622 | B2 | 1/2017 | Jung | |
| 9,718,076 | B2 | 8/2017 | Oh | |
| 10,561,873 | B2 | 2/2020 | Beagen et al. | |
| 11,125,359 | B2 | 9/2021 | Beagen et al. | |
| 2002/0066834 | A1 | 6/2002 | Choi | |
| 2005/0139743 | A1 | 6/2005 | Shim | |
| 2006/0261235 | A1 | 11/2006 | Rippel et al. | |
| 2008/0099640 | A1 | 5/2008 | Kafenshtok et al. | |
| 2010/0276558 | A1 | 11/2010 | Faust et al. | |
| 2011/0094760 | A1 | 4/2011 | Im | |
| 2011/0260012 | A1 | 10/2011 | Oh | |
| 2011/0315409 | A1 | 12/2011 | Silcox et al. | |
| 2012/0097406 | A1 | 4/2012 | Silcox et al. | |
| 2013/0105641 | A1 | 5/2013 | Feenstra et al. | |
| 2013/0220649 | A1 | 8/2013 | Silcox et al. | |
| 2013/0255123 | A1 * | 10/2013 | Boyer | G09F 13/0413 |
| | | | | 40/607.14 |
| 2013/0284862 | A1 | 10/2013 | Lim | |
| 2013/0291461 | A1 | 11/2013 | Oh | |
| 2014/0117188 | A1 | 5/2014 | Wronski | |
| 2015/0060613 | A1 | 3/2015 | Lim | |
| 2016/0023028 | A1 | 1/2016 | Jung | |
| 2016/0025122 | A1 | 1/2016 | Jung | |
| 2016/0199680 | A1 | 7/2016 | Jung et al. | |
| 2016/0296778 | A1 | 10/2016 | Seo et al. | |
| 2017/0197101 | A1 | 7/2017 | Chong | |
| 2017/0303719 | A1 * | 10/2017 | Irestahl | A47G 25/483 |
| 2018/0100527 | A1 | 4/2018 | Dafonseca et al. | |
| 2018/0100607 | A1 | 4/2018 | Dafonseca et al. | |
| 2018/0161612 | A1 * | 6/2018 | Mitchell | F16L 3/1075 |
| 2019/0262644 | A1 | 8/2019 | Beagen et al. | |
| 2020/0155884 | A1 | 5/2020 | Beagen et al. | |

OTHER PUBLICATIONS

Beagen, Jr., Joseph William; UK Examination Report for application No. 2203437.5, filed Feb. 13, 2019, dated Sep. 12, 2022, 5 pgs.
Beagen, Joseph William; Search report for UK patent application No. 2203438.3, filed Feb. 13, 2019, dated May 26, 2022, 4 pgs.
Beagen, Joseph; Non-Final Office Action for U.S. Appl. No. 15/903,482, filed Feb. 23, 2018, dated May 24, 2019, 23 pgs.
Beagen, Joseph; Notice of Allowance for U.S. Appl. No. 15/903,482, filed Feb. 23, 2018, dated Oct. 8, 2019, 16 pgs.
Beagen, Joseph; Final Office Action for U.S. Appl. No. 16/733,799, filed Jan. 3, 2020, dated Aug. 20, 2020, 13 pgs.
Beagen, Joseph; Non-Final Office Action for U.S. Appl. No. 16/733,799, filed Jan. 3, 2020, dated Jan. 11, 2021, 20 pgs.
Beagen, Joseph; Non-Final Office Action for U.S. Appl. No. 16/733,799, filed Jan. 3, 2020, dated Apr. 21, 2020, 17 pgs.
Beagen, Joseph; Notice of Allowance for U.S. Appl. No. 16/733,799, filed Jan. 3, 2020, dated May 21, 2021, 7 pgs.
Beagen, Joseph; International Preliminary Report on Patentability for PCT Application No. PCT/US19/17771, filed Feb. 13, 2019, dated Sep. 3, 2020, 9 pgs.
Beagen, Joseph; International Search Report and Written Opinion for PCT Application No. PCT/US19/17771, filed Feb. 13, 2019, dated Apr. 23, 2019, 11 pgs.

* cited by examiner

BRACKET ASSEMBLY FOR FIRE SPRINKLER SUPPORT ASSEMBLY

CROSS-REFERENCE TO RELATED APPLICATIONS

The present application is a continuation of U.S. application Ser. No. 16/733,799, filed Jan. 3, 2020, which is a continuation of U.S. application Ser. No. 15/903,482, filed Feb. 23, 2018, both of which are hereby specifically incorporated by reference herein in their entireties.

BACKGROUND OF THE DISCLOSURE

Field of the Disclosure

The present disclosure relates to fire protection sprinkler drop support systems and, more particularly, to an angled bracket for a fire sprinkler support assembly.

Discussion of Related Art

A typical automatic fire sprinkler system includes a network of pipes that carry a fire suppression fluid, e.g., water, to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated, allowing a stream of fire suppression fluid to be directed over the intended area of coverage. During operation, the fluid pressure at the sprinkler head can reach as high as 175 psi, generating significant back pressure on the sprinkler support system. The support assembly is used to hold the sprinkler securely in place during operation.

Some known sprinkler support assemblies are designed to be secured to a ceiling structure by fasteners such as screws or bolts, which must be tightened using special tools in a time consuming process. In grid-type ceiling systems, the sprinkler head typically extends through an opening in a central area of one or more ceiling tiles. Grid-type ceiling systems offer a limited amount of space between the ceiling tiles and the inner structure of the ceiling. Some conventional approaches attempt to address this by providing leg brackets that are offset with respect to the support member of the ceiling grid. However, this approach provides a weak point at the bend in the leg, which is prone to failure.

SUMMARY OF THE DISCLOSURE

In view of the foregoing, there is a need in the art for a bracket for coupling a fire sprinkler support assembly to a beam of a ceiling grid system, wherein the bracket has sufficient clearance to allow the installation of ceiling tiles after a flexible drop is installed.

A method for mounting a support assembly to a ceiling support structure is disclosed, the method comprising providing the support assembly, the support assembly comprising a bracket assembly, the bracket assembly comprising a first plate, a second plate, and a seating frame; positioning the seating frame in an open position; positioning a portion of the ceiling support structure within a space defined between the first and second plates; and securing the bracket assembly to the ceiling support structure.

Also disclosed is a bracket assembly comprising an inner plate defining a first end and a second end opposite the first end; an outer plate defining a first end and a second end opposite the first end, the outer plate substantially parallel with the inner plate; a first member extending from the second end of the inner plate, the first member defining a first free end distal to the inner plate; and a second member extending from the second end of the outer plate, the second member defining a second free end distal to the outer plate; wherein at least one of the first free end and the second free end is angled away from the other of the first free end and the second free end, such that a distance between the first member and the second member increases towards the first and second free ends.

Additionally, disclosed is a bracket assembly comprising an inner plate defining a first end and a second end opposite the first end, an inner stiffening ridge extending at least partially along a length of the inner plate; an outer plate defining a first end and a second end opposite the first end, the outer plate substantially parallel with the inner plate, an outer stiffening ridge extending at least partially along a length of the outer plate; and an upper wall extending between the first end of the inner plate and the first end of the outer plate.

In some embodiments, a fire sprinkler support assembly may include a bracket bar operable to extend transverse to a beam, and a bracket assembly coupled to at least one end of the bracket bar. The bracket assembly may include a set of plates extending from an upper wall, the set of plates having a first end coupled to the bracket bar and a second end opposite the first end. An interior angle between the set of plates and the bracket bar may be less than 90 degrees. The bracket assembly may further include a seating frame extending from the second end of the set of plates, the seating frame including a first member and a second member disposed on opposite sides of the beam such that the first member and the second member straddle the beam. The bracket assembly may further include a fastener directly coupling the bracket assembly to the bracket bar.

In some embodiments, a fire sprinkler support assembly may include a bracket bar operable to extend transverse to a beam, and a bracket assembly coupled to at least one end of the bracket bar. The bracket assembly may include an upper wall, and an inner plate and an outer plate extending from opposite sides of the upper wall. The inner plate and the outer plate may have a first end coupled to the bracket bar and a second end opposite the first end, wherein an interior angle between the bracket bar and the inner plate is less than 90 degrees. The bracket assembly may further include a seating frame extending from the second end of the inner plate and the outer plate, the seating frame including a first member and a second member disposed on opposite sides of the beam such that the first member and the second member straddle the beam. The bracket assembly may further include a fastener extending through an opening in the upper wall, the fastener operable to engage the bracket bar.

In some embodiments, a bracket assembly coupled to at least one end of a bracket bar may include an inner plate and an outer plate extending from opposite sides of an upper wall, the inner plate and the outer plate each having a first end coupled to the bracket bar and a second end opposite the first end, wherein an interior angle between the bracket bar and the inner plate is less than 90 degrees. The bracket assembly may further include a seating frame including a first member extending from the second end of the inner plate, and a second member extending from the second end of the outer plate, wherein the first and second members are disposed on opposite sides of a beam such that the first member and the second member straddle the beam. The second member may include a plurality of arms extending over an upper rim of the beam, the arms spaced apart from one another on opposite sides of the first member. The bracket assembly may further include a fastener extending through an opening in the upper wall, the fastener operable to engage the bracket bar.

BRIEF DESCRIPTION OF THE DRAWINGS

The accompanying drawings illustrate exemplary approaches of the disclosure, including the practical application of the principles thereof, and in which.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now proceed with reference to the accompanying drawings, in which various approaches are shown. It will be appreciated, however, that the disclosed angled bracket and fire sprinkler support assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, exemplary approaches herein provide a snap-to-grid angled bracket and bracket assembly for use with a fire suppression device. In one approach, a support assembly includes a bracket bar extending transverse to a beam, and a bracket assembly coupled to the bracket bar. The bracket assembly may include an upper wall and a set of plates extending from the upper wall, wherein the set of plates have a first end coupled to the bracket bar. An interior angle between the set of plates and the bracket bar is less than 90 degrees (e.g., 80-85°). The bracket assembly may further include a seating frame extending from a second end of the set of plates, the seating frame including a first member and a second member disposed on opposite sides of the beam such that the first member and the second member straddle the beam. The fire sprinkler support assembly may further include a fastener extending through an opening of the upper wall to couple the set of plates to the bracket bar.

Exemplary embodiments of brackets/brackets for fire sprinkler support assemblies described herein may be designed for a T-bar suspended beam of a grid support system. When installing the bracket assembly onto T-bar body, users can "snap" the bracket assembly onto the T-bar beam. Once the bracket assembly is positioned in place, the user can further secure/anchor the bracket assembly to the T-bar beam using one or more fasteners, which will bias the seating frame together on the T-bar beam. To un-anchor the bracket assembly from the T-bar beam, the user may disengage/loosen/release the fastener to unlock the seating frame from the T-bar beam.

Figure 1:
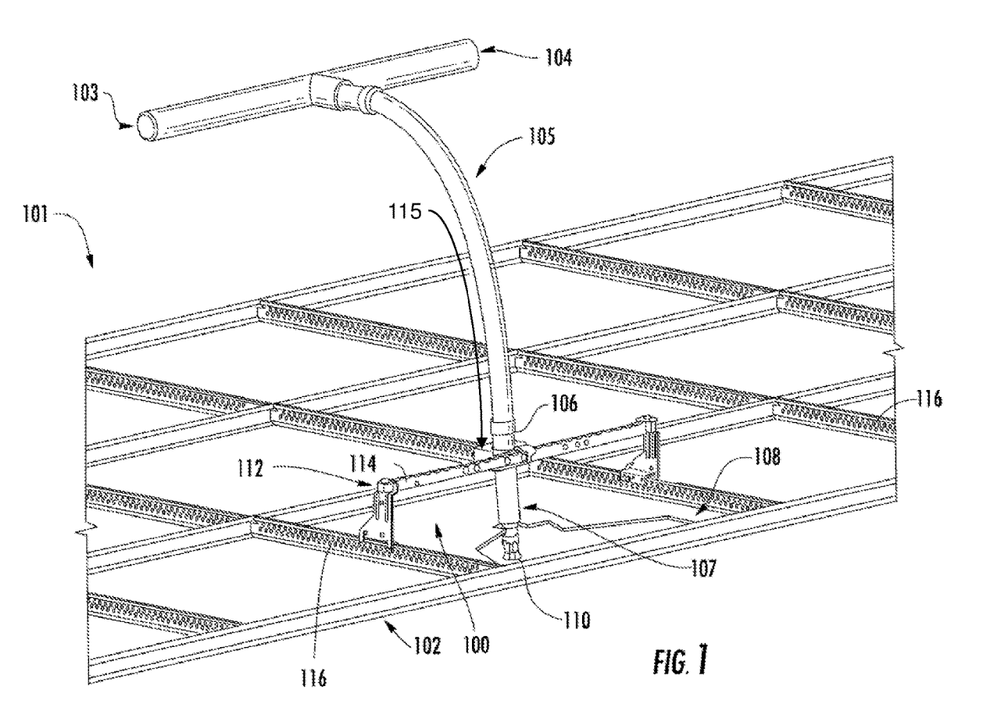
FIG. 1 is a perspective view of a fire sprinkler support assembly mounted within a ceiling according to exemplary approaches of the disclosure.
Figure 2:
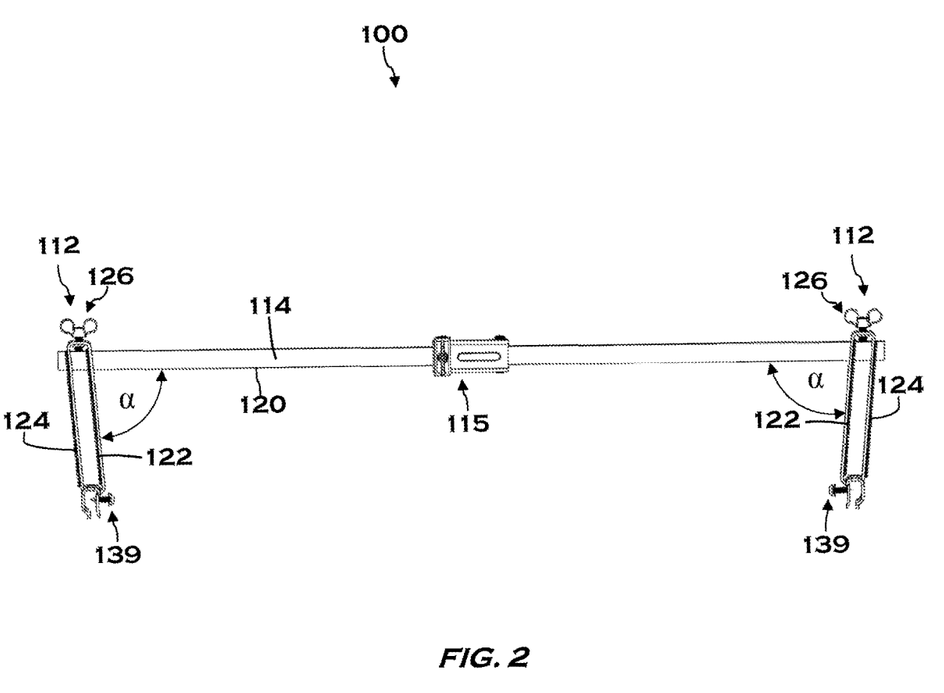
FIG. 2 is a side view of the fire sprinkler support assembly of FIG. 1 according to exemplary approaches of the disclosure.

FIGS. 1-2 show a fire sprinkler support assembly (hereinafter "support assembly") 100 mountable within a ceiling 101 having a ceiling frame 102 of rectangular frame sections arranged in a grid pattern. In some embodiments the ceiling frame 102 may be a suspended ceiling. A fire sprinkler system 103 can include supply pipes 104 as part of a fire suppression fluid delivery system. The fire sprinkler system 103 can also include a flexible hose 105, which can couple, via a union nut 106, to the sprinkler drop 107. A ceiling panel 108 may be positioned within a section of the ceiling frame 102, and a sprinkler head 110 may be coupled to a distal end of the sprinkler drop 107, below an opening in the ceiling panel 108. During operation, in the event of a fire, a thermally responsive device of the sprinkler head 110 reacts to heat generated by the fire to allow fluid (e.g., water, nitrogen, and/or halogen) to flow through the sprinkler drop 107 and into the sprinkler head 110, where the fluid is dispersed outwardly to extinguish the fire. In order to protect the room from fire, the support assembly is most commonly located above the ceiling panel 108, but can also reside in a floor or in one or more walls of a building structure.

The support assembly 100 may secure the sprinkler head 110 at a predetermined position within an associated one of ceiling panels 108. In order to function effectively, fire sprinkler head 110 must be held firmly in place during operation. Due to the significant back pressure of the fluid flowing therethrough, fire sprinkler head 110 is subjected to significant side, rotational, and torsional forces, which are capable of changing the position of the fire sprinkler head 110, thereby causing the fluid to be directed away from the intended target. The sprinkler support assembly 100 is configured to resist movement of fire sprinkler head 110 by distributing the forces to spaced-apart points along beams 116, which are arranged as a grid.

The support assembly 100 further includes a bracket assembly 112 coupled to at least one end of a bracket bar 114, which in turn is coupled to the flexible hose 105 by a hub connector 115. In exemplary embodiments, a pair of bracket assemblies 112 are disposed on opposite ends of the bracket bar, e.g., as shown. The bracket assemblies 112 connect to each of a pair of adjacent beams 116 of the ceiling frame 102. In one embodiment, each of the beams may be a t-shaped beam (i.e., a T-bar) suspended from an overlying building structure using, for example, flexible wire, and may be configured according to ASTM International standards. The standards may include, but are not limited to, those set forth in one or more of designations C635, C636 and E580, which are each incorporated herein by reference.

As shown in FIG. 2, each bracket assembly 112 is an angled bracket. That is, an interior angle α between the bracket assembly 112 and the bracket bar 114 is less than 90 degrees. In some embodiments, the interior angle α is measured between an underside 120 of the bracket bar 114 and a set of plates, such as an inner plate 122 and an outer plate 124 of each bracket assembly 112. Although not limited to any specific angle, the interior angle α may be between 80-85° in various embodiments. Advantageously, by tilting the inner plate 122 and the outer plate 124 outwardly, e.g., by approximately 5°, the diagonal space from top inner corner of an intersection of the inner plate 122 and the outer plate 124 and the bracket bar 114 may be greater than 0.6096 meters (i.e., 24"), thus allowing a standard 0.6096 (i.e., 24") ceiling tile to be installed after the flexible drop 107 (FIG. 1) is installed.

In some embodiments, the bracket assemblies 112 include a fastener 126 coupling the inner plate 122 and the outer plate 124 to the bracket bar 114. The fasteners 126 may extend through an opening in an upper wall 130 for impact with the bracket bar 114. In some embodiments, the fasteners 126 may further extend through an opening in the bracket bar 114. Although non-limiting, the fasteners 126 may include a wing nut operable with a screw or bolt. A second fastener 139 (e.g., a screw) may be provided through either of the inner plate 122 and the outer plate 124 for engagement with the beam. In the non-limiting embodiment shown, the second fastener 139 is coupled to the inner plate 122.

Figure 3:
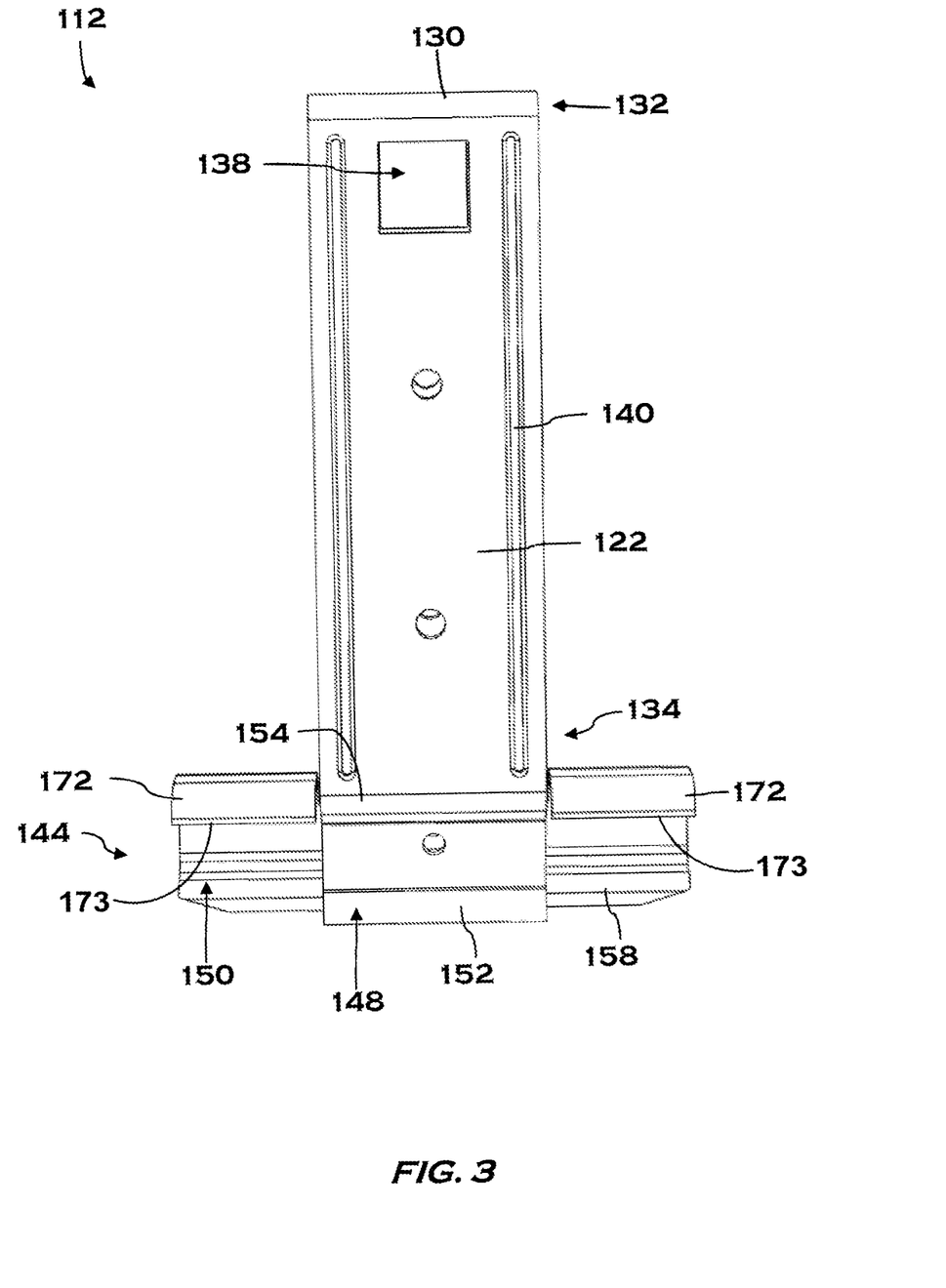
FIG. 3 is a first end view of a bracket of the fire sprinkler support assembly of FIG. 2 according to exemplary approaches of the disclosure.
Figure 4:
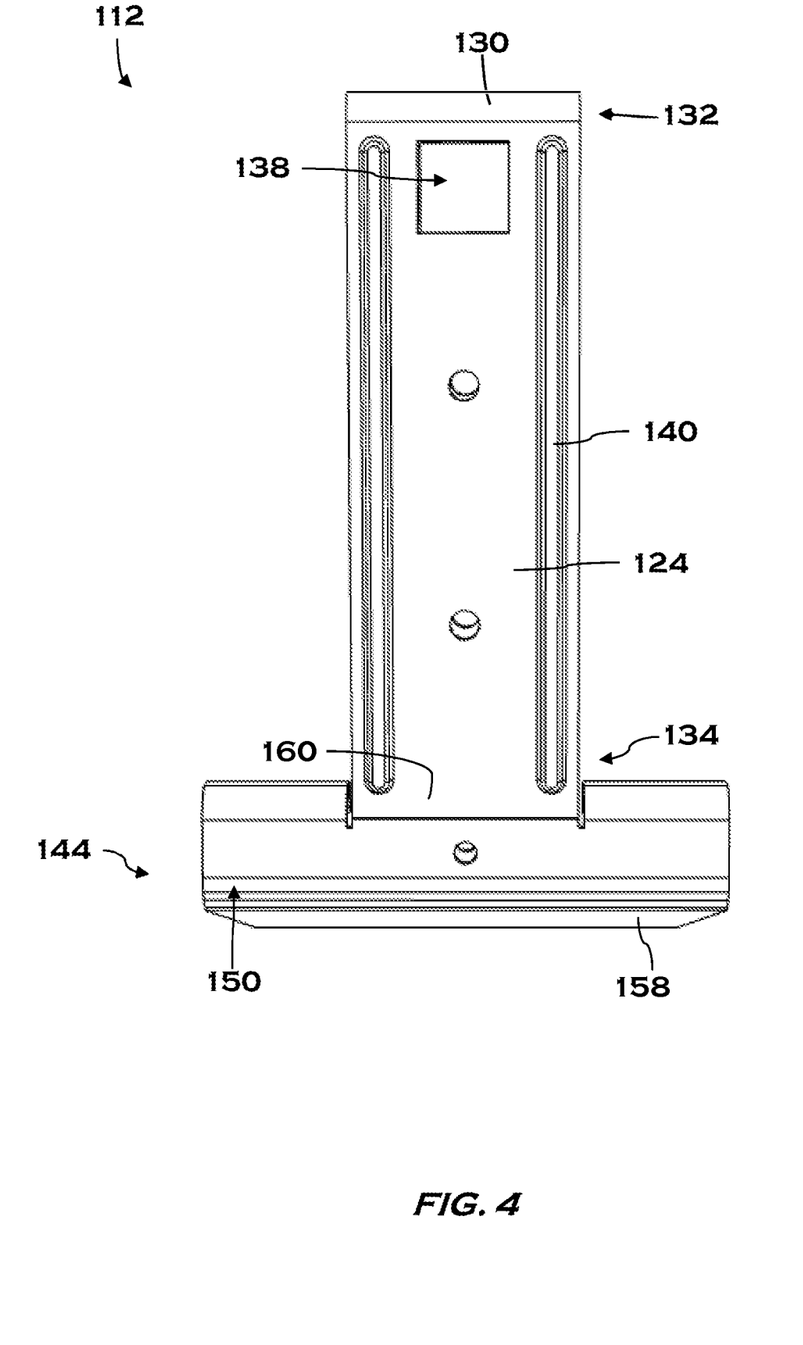
FIG. 4 is a second end view of the bracket of the fire sprinkler support assembly of FIG. 2 according to exemplary approaches of the disclosure.
Figure 5:
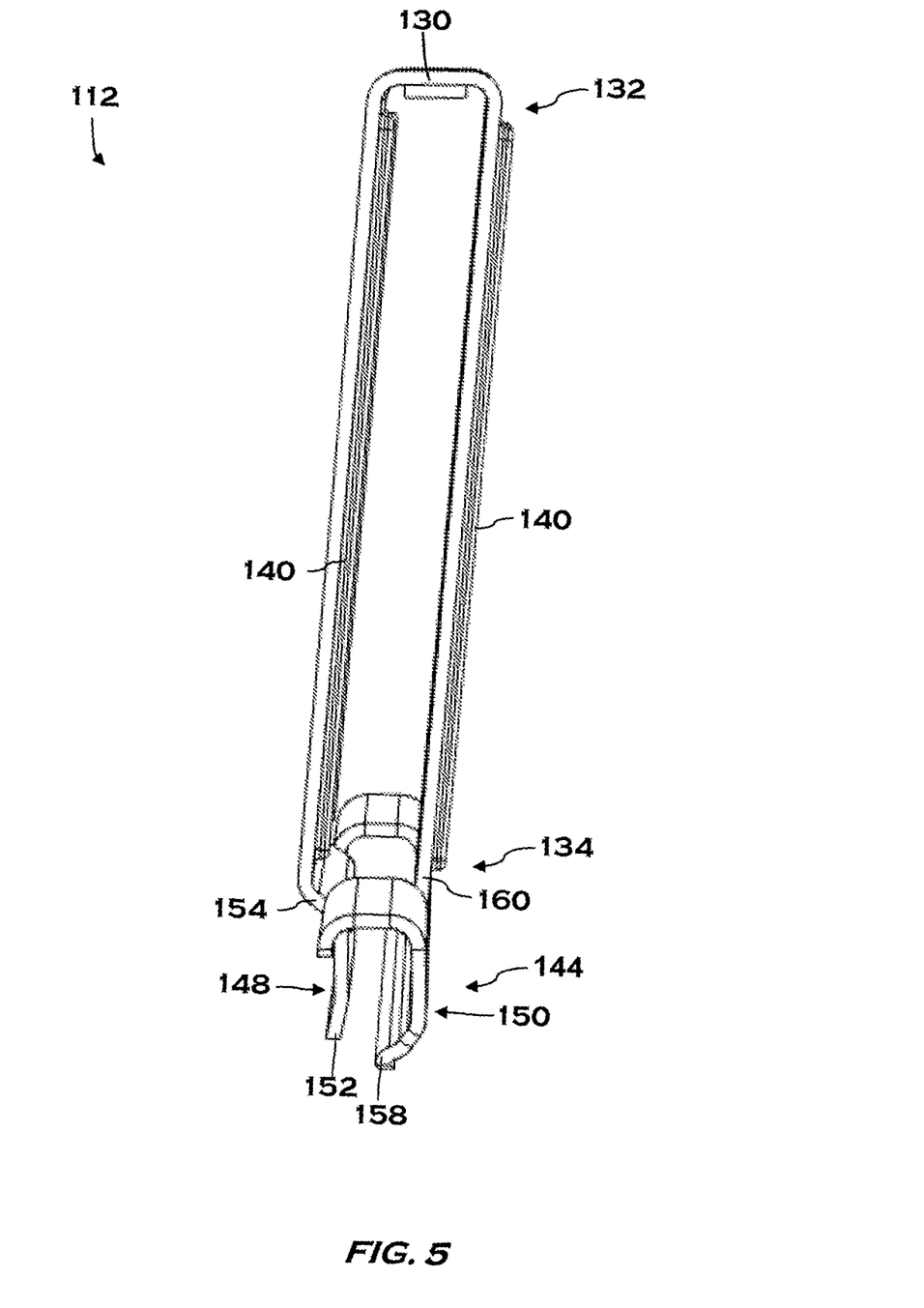
FIG. 5 is a side view of the bracket of the fire sprinkler support assembly of FIG. 2 according to exemplary approaches of the disclosure.

Turning now to FIGS. 3-5, a non-limiting bracket assembly 112 according to embodiments of the present disclosure will be described in greater detail. The bracket assembly 112 may include the upper wall 130 having an opening provided therein to receive the fastener 126 (FIG. 2). The inner plate 122 and the outer plate 124 extend from the upper wall 130 at an acute angle relative to the bracket bar 114, as described above. In some embodiments, the inner plate 122 and the outer plate 124 are oriented parallel to one another. As further shown, the inner plate 122 and the outer plate 124 may have a first end 132 coupleable to the bracket bar 114, and a second end 134, opposite the first end 132. An opening 138 may be provided through each of the inner plate 122 and the outer plate 124 for receiving the bracket bar 114 therethrough. As such, the upper wall 130 is configured to extend over the bracket bar 114 once assembled. One or more stiffening ridges 140 may be provided along each of the inner plate 122 and the outer plate 124.

The bracket assembly 112 may further include a seating frame 144 extending from the second end 134 of the inner plate 122 and the outer plate 124. The seating frame 144 may include a first member 148 and a second member 150 disposed on opposite sides of the beam such that the first member 148 and the second member 150 straddle the beam. As shown, the first member 148 may include a first free end 152 and a first fixed end 154. The first fixed end 154 may be integrally coupled with and extend from the inner plate 122. As further shown, the second member 150 may include a second free end 158 and a second fixed end 160. The second fixed end 160 may be integrally coupled with and extend from the outer plate 124.

Figure 6:
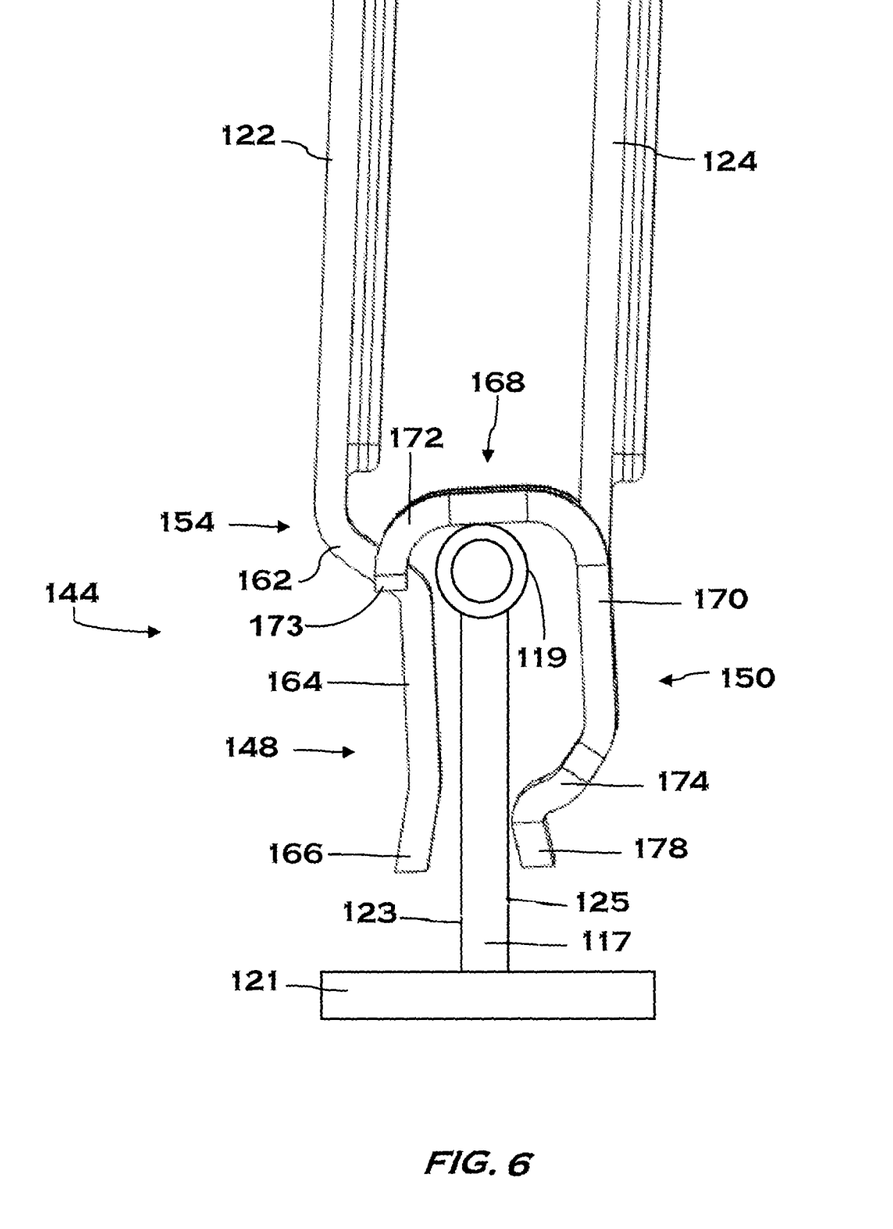
FIG. 6 is a partial side view of the bracket of fire sprinkler support assembly mounted atop a beam according to exemplary approaches of the disclosure.

Turning now to FIG. 6, the seating frame 144 of the bracket assembly 112 according to embodiments of the present disclosure will be described in greater detail. The seating frame 144 is shown atop a t-shaped beam 116 including a flange 117, an upper rim 119, and a base 121. As shown, the first member 148, which extends from the inner plate 122, may include a first section 162 extending/bending towards the outer plate 124. The first section 162 may correspond to the first fixed end 154. Extending downwardly from the first section 162 is a second section 164, wherein the first section 162 and the second section 164 may be integrally coupled/formed together. In some embodiments, the second section 164 may be parallel, or substantially parallel, to the flange 117 of the beam 116. The second section 164 may be perpendicular, or substantially perpendicular, to the bracket bar (not shown) even though the inner plate 122 and the outer plate 124 are oriented at an angle relative to the bracket bar. This ensures that during use, the second section 164 may engage an inner surface 123 of the flange 117 to secure the first member 148 to the beam 116. As further shown, a third section 166 of the first member 148 may extend downwardly from the second section 164. In some embodiments, the third section 166 may extend at an angle away from the outer plate 124 and away from the beam 116 to permit the first member 148 to more easily slide past the upper rim 119 during installation.

As further shown, the second member 150 may include a first section 168 extending towards the inner plate 122, and a second section 170 extending downwardly from the first section 168.

In some embodiments, the first section 168 includes one or more arms 172 extending over the upper rim 119 of the beam 116. The arms 172 may include a free end 173 extending past or partially past the first member 148. In some embodiments, the arms 172 may be spaced apart from one another, for example, on opposite sides of the first member 148, as shown in FIG. 3. Furthermore, the arms 172 be curved about the upper rim 119 to better secure the second member 150 to the beam 116.

The second section 170 may be integrally coupled/formed with the first section 168. In some embodiments, the second section 170 may be parallel, or substantially parallel to the flange 117 of the beam 116. The second section 170 may be perpendicular, or substantially perpendicular, to the bracket bar (not shown) even though the inner plate 122 and the outer plate 124 are oriented at an angle relative to the bracket bar.

The second member 150 may further include a third section 174 connected to the second section 170. As shown, the third section 174 may extend towards the inner plate 122 and towards the flange 117. During use, the third section 174 may engage an outer surface 125 of the flange 117 to secure the second member 150 to the beam 116. The second member 150 may further include a fourth section 178 connected to the third section 174, the fourth section 178 extending away from the inner plate 122 and away from the flange 117 to permit the second member 150 to more easily slide past the upper rim 119 during installation.

For each of the herein described embodiments, a non-limiting method of mounting the support assembly to a ceiling support structure (e.g., a beam) will now be described. First, with the seating frame of the bracket in the open position, the bracket assembly of the support assembly is fitted onto the corresponding beam(s). Fitting the bracket assembly onto the beam may include manually spreading the first and second plates apart to obtain adequate spacing to accept the upper rim and the flange of the beam. Next, when the support assembly is in the desired location about beam, the first fastener may be tightened to secure the upper wall of the bracket assembly to the bracket bar. The second fastener extending through one of the set of plates may also be tightened to secure the bracket assembly to the flange of the beam. To remove the support assembly, the first and second fasteners may again be actuated to an open position, and the bracket assembly may be lifted from the beam.

It will be appreciated that embodiments of the disclosure provide at least the following advantages. Firstly, by providing a bracket assembly having angled plates, users are able to first install the bracket assembly, followed by the ceiling tile, due to the high clearance afforded by the bracket assembly design. Secondly, the configuration of the seating frame allows the bracket assembly to "snap" to the beam, thus allowing the bracket to be installed faster, and potentially by hand, thus reducing tooling such as cordless drills and drivers. Thirdly, the brackets are designed to hold a sprinkler head firmly in place during operation by resisting side, rotational, and torsional forces, thus satisfying UL requirements for use in the fire protection industry.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A bracket assembly comprising:
an inner plate defining a first end and a second end opposite the first end;
an outer plate defining a first end and a second end opposite the first end of the outer plate, the outer plate substantially parallel with the inner plate;
a first member extending from the second end of the inner plate, the first member defining a first free end distal to the inner plate; and
a second member extending from the second end of the outer plate, the second member including a first section extending towards the inner plate and a second section extending downwardly from the first section, the first section comprising an arm configured to extend at least partially about and support the bracket assembly on a rim of a beam, the second section defining a second free end distal to the outer plate;
wherein a portion of the arm distal to the second section is curved;
wherein at least one of the first free end and the second free end is angled away from the other of the first free end and the second free end, such that a distance between the first member and the second member increases towards the first and second free ends.

2. The bracket assembly of claim 1, wherein the first free end is angled away from the second free end and the second free end is angled away from the first free end.

3. The bracket assembly of claim 1, wherein:
the first member is configured to extend along a first side of the beam;
the second section of the second member is configured to extend along a second side of the beam opposite the first side; and
the curved portion of the arm defines an arm free end distal to the second section and is configured to be disposed on the first side of the beam.

4. The bracket assembly of claim 3, wherein the arm free end extends at least partially past the first member.

5. The bracket assembly of claim 3, wherein the arm is a first arm, the first section further comprises a second arm, and the first arm and the second arm are spaced apart on opposing sides of the first member.

6. The bracket assembly of claim 1, further comprising an upper wall extending between the first end of the inner plate and the first end of the outer plate.

7. The bracket assembly of claim 6, wherein the upper wall defines an opening therethrough, the bracket assembly further comprising a fastener extending through the opening.

8. The bracket assembly of claim 6, wherein the upper wall is oriented about horizontally, and wherein each of the inner plate and the outer plate are oriented at an acute angle relative to horizontal.

9. A bracket assembly comprising:
an inner plate defining a first end and a second end opposite the first end, an inner stiffening ridge extending at least partially along a length of the inner plate;
an outer plate defining a first end and a second end opposite the first end of the outer plate, the outer plate substantially parallel with the inner plate, an outer stiffening ridge extending at least partially along a length of the outer plate; and
an upper wall extending between the first end of the inner plate and the first end of the outer plate; and
an outer lower member extending from the second end of the outer plate, the outer lower member comprising an arm extending towards the inner plate and configured to extend at least partially about and support the bracket assembly on a rim of a beam;
wherein a portion of the arm proximal to the inner plate is curved.

10. The bracket assembly of claim 9, wherein the inner plate defines an inner surface and an outer surface opposite the inner surface, the inner surface facing the outer plate, the inner stiffening ridge extending from the inner surface.

11. The bracket assembly of claim 10, wherein the outer plate defines an inner surface and an outer surface opposite the inner surface of the outer plate, the inner surface of the outer plate facing the inner plate, the outer stiffening ridge extending from the outer surface of the outer plate.

12. The bracket assembly of claim 9, wherein:
the inner stiffening ridge is a first inner stiffening ridge and the outer stiffening ridge is a first outer stiffening ridge;
the bracket assembly further comprises a second inner stiffening ridge extending at least partially along a length of the inner plate, the second inner stiffening ridge substantially parallel with the first inner stiffening ridge; and the bracket assembly further comprises a second outer stiffening ridge extending at least partially along a length of the outer plate, the second outer stiffening ridge substantially parallel with the first outer stiffening ridge.

13. The bracket assembly of claim 12, wherein:

an inner opening is formed through the inner plate between the first and second inner stiffening ridges;

an outer opening is formed through the outer plate between the first and second outer stiffening ridges; and the inner opening is laterally aligned with the outer opening.

14. The bracket assembly of claim 13, wherein the inner opening is formed adjacent to the first end of the inner plate and the outer opening is formed adjacent to the first end of the outer plate.

15. The bracket assembly of claim 9, wherein each of the inner plate and the outer plate are oriented at an acute angle relative to horizontal.

16. The bracket assembly of claim 15, wherein the outer lower member defines an outer free end distal to the outer plate, and wherein the bracket assembly further comprises:

an inner lower member extending from the second end of the inner plate, the inner lower member defining an inner free end distal to the inner plate.

17. The bracket assembly of claim 16, wherein at least one of the outer free end and the inner free end is angled away from the other of the outer free end and the inner free end, such that a distance between the outer lower member and the inner lower member increases towards the outer and inner free ends.

* * * * *